Patented Nov. 11, 1930

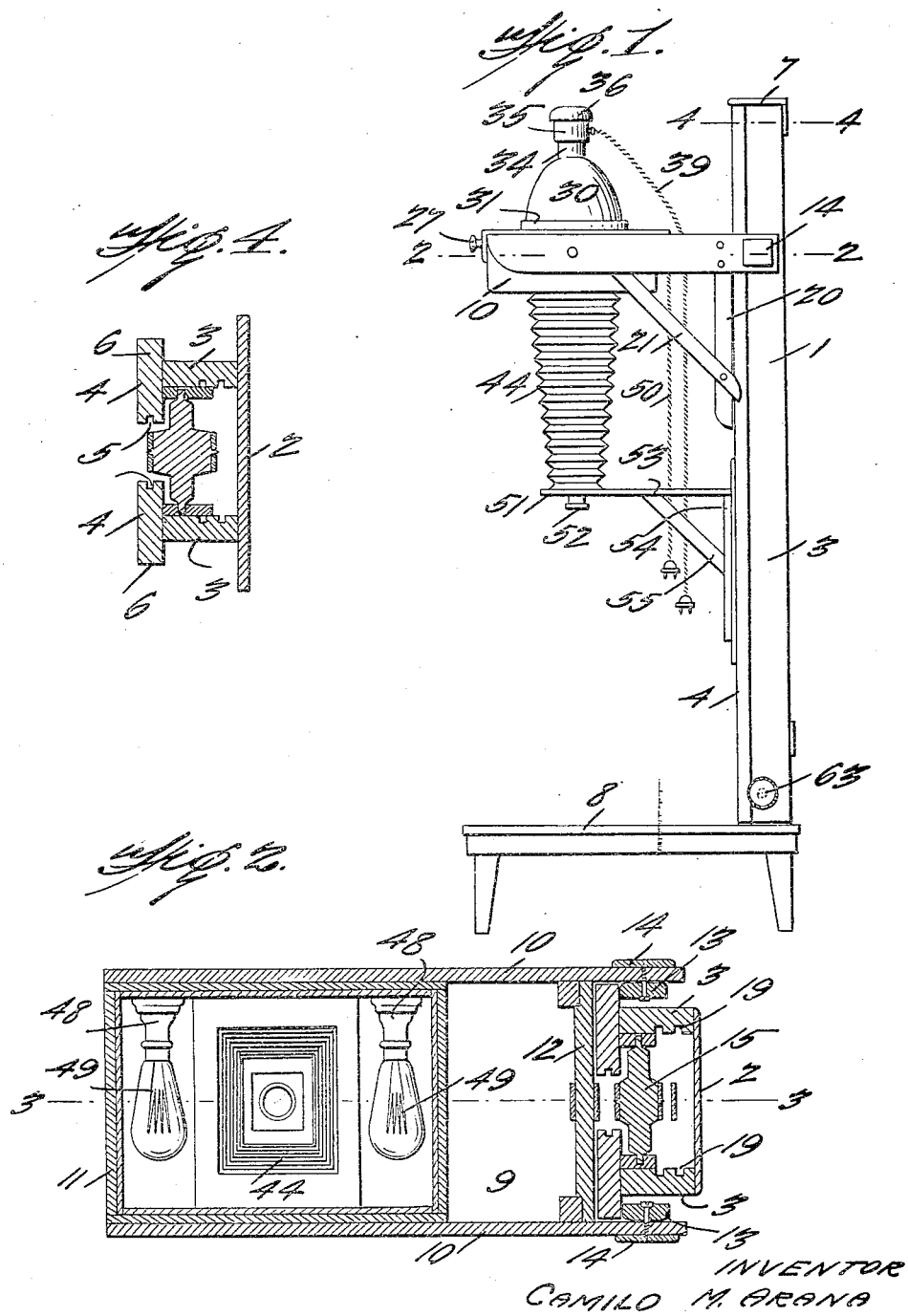

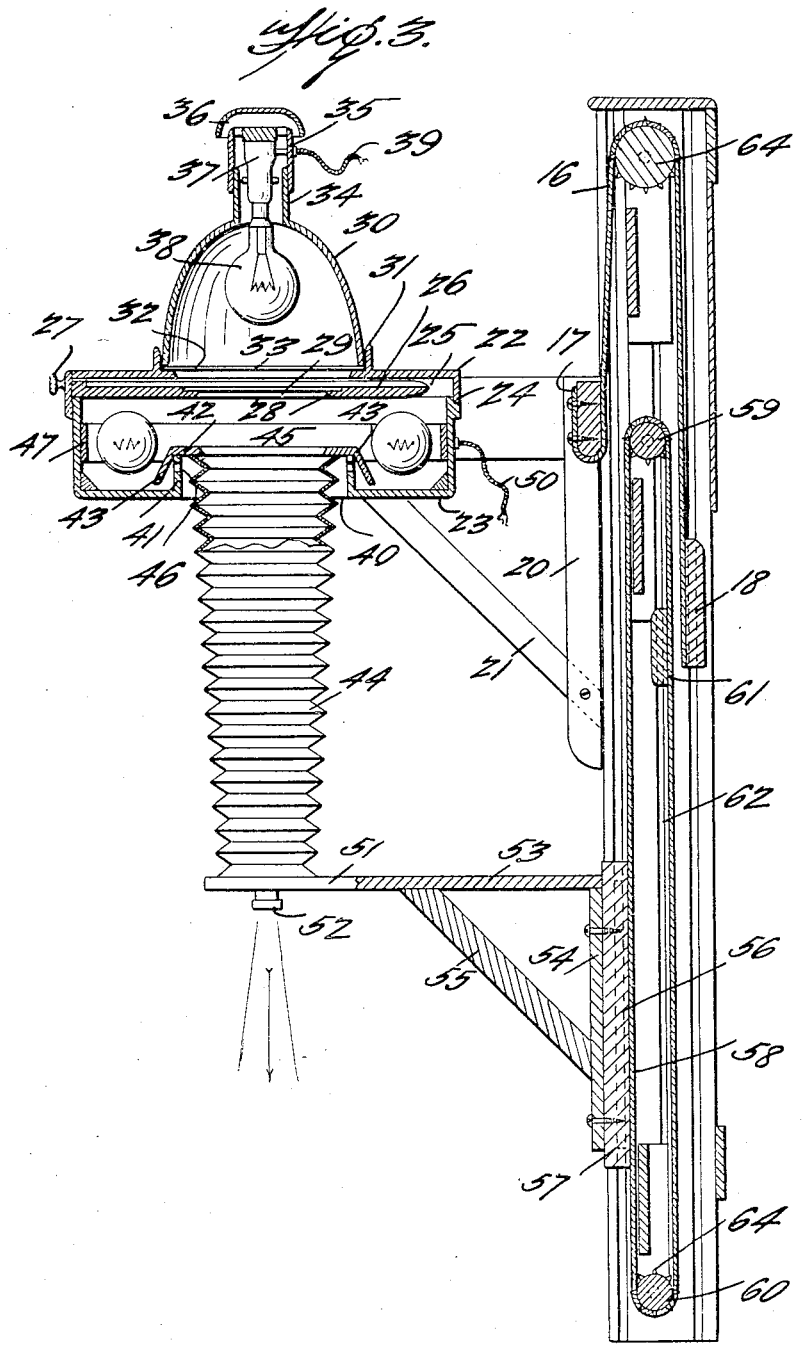

1,781,044

UNITED STATES PATENT OFFICE

CAMILO MEDINA ARANA, OF HABANA, CUBA

PHOTOGRAPHIC REPRODUCTION APPARATUS

Application filed November 1, 1928. Serial No. 316,560.

This invention is directed to an improvement in photographic reproduction apparatus wherein the reproduction may be produced from an image on an opaque or transparent base and in which the relative size of the reproduction may be varied at will.

The primary object of the present invention is the provision of a frame adapted to be supported relative to a surface on which the sensitized material is to be placed, on which frame is supported for counterbalanced free vertical movement a camera designed to receive the image to be reproduced and constructed to provide for light transmission through the lens of the camera, either through the image when the latter is transparent or reflected from the image when the latter is opaque.

The invention is illustrated in the accompanying drawings, in which:

Figure 1 is a view in side elevation of the improved apparatus.

Figure 2 is an enlarged transverse section on the line 2—2 of Figure 1.

Figure 3 is an enlarged vertical section through the apparatus taken approximately on the line 3—3 of Figure 2.

Figure 4 is an enlarged section on the line 4—4 of Figure 1.

The improved apparatus comprises an upright 1 of hollow form including a rear wall 2, side walls 3 and a front wall made up of spaced sections 4, the proximate edges of which are formed with longitudinally ranging grooves or channels 5. The front wall sections 4 extend laterally beyond the side walls 3 forming guiding projections 6 for a purpose which will later appear.

The upper end of the upright may be removably closed by a cover section 7, and the upright is designed to be provided with any suitable means whereby it may be supported at substantially right angles to and above a table or like support 8 on which the sensitized material for the reproduction is to be positioned.

The camera comprises a hollow box-like frame 9 made up of side walls 10, a front wall 11, and an inner or rear wall 12 located forwardly of the rear vertical edges of the side walls 10, as clearly indicated in Figure 2. The side walls inwardly or rearwardly of the wall 12 are provided with guiding rollers 13, the mountings of which may be reinforced, if desired, as by strips 14. These guide rollers bear against the relatively rear surfaces of the guide projections 6, whereby the camera frame is supported for vertical movement.

Mounted within the upright 1 near the upper end thereof and between the side walls 3 is a roller 15 over which passes a flexible band 16, one terminal of which is secured to the wall 12 of the camera frame, as at 17, and the opposite terminal of which is connected to a weight 18 slidably guided in grooves 19 formed in the inner surfaces of the side walls 3 of the upright. The weight counterbalances the camera frame and the camera carried thereby, providing for convenient vertical adjustment of the camera in a manner to permit it to be held against casual displacement in any desired position of vertical adjustment.

The camera frame is guided in its vertical movement against tilting by guide bars 20 which are secured to the wall 12 of the frame at their upper ends and depend below the frame in sliding contact with the front surfaces of the front wall sections 4 of the upright, as clearly shown in Figure 3. If desired, brace rods 21 may extend from the lower ends of the guide bars 20 to the side walls 10 of the camera frame in advance of the rear wall 12 thereof.

The camera proper comprises a casing made up of upper and lower sections 22 and 23 designed for removable interconnection at 24 in any appropriate manner. The upper section 22 overlies the upper edge of the lower section 23, so that the latter forms in effect a plurality of guiding ledges 25 to slidably receive an image frame 26 which may be introduced into position through a closure 27 and which is formed in its upper surface with a recess 28 to receive and support the image to be reproduced and with an opening 29 coincident with the recess 28 but of slightly less linear dimensions than such recess.

A conical reflector 30 is arranged to have its free marginal edge frictionally engaged within a flange 31 projecting from the upper edge of the camera section 22, so that the reflector overlies an opening 32 formed in the upper wall of the section 22. If desired and as preferred, the open end of the reflector may be covered by a transparent or glass section 33 which may be more or less translucent and of suitable color, though obviously such glass may be of natural, slightly opaque formation if desired.

The reflector has an upstanding hollow neck 34 to receive and support the light socket carrier 35 and a removable hood cover 36 which overlies the opening and is spaced at its lower edges from the wall of the light socket carrier 35 to provide ventilation without directly admitting exterior light to the interior of the camera. The socket holder 35 carries the usual socket 37 to receive a lamp 38 which thus depends within and is of course disposed at the focal point of the reflector, the lamp being energized by the usual conductor 39.

The lower section 23 of the camera is provided with a central opening 40 having an upstanding marginal flange 41. A bellows plate 42 overlies and bears upon the upper edge of the flange 41, this bellows plate 42 having a marginal flange 43 which is bent outwardly or downwardly, considering the operative position of the camera, beyond the flange 41. The upper end of the usual bellows 44 is connected to the bellows plate 42 surrounding an opening 45 in such bellows plate. The arrangement of the flange 43 of the bellows plate serves to accurately position the bellows in its relation to the camera, this flange 43 serving to also overlie ventilating openings 46 formed in the flange 41.

Supported within the section 23 of the camera casing is a rectangular support 47 in which is mounted a lamp socket 48 to receive lamps 49, the relation of the parts being such that the lamps 49 are disposed within the section 23 on the respective sides of the bellows plate 42, being thus out of direct line with the opening 46. The lamps 49 are energized in series through the usual conductor 50.

The end of the bellows remote from the bellows plate is connected to the usual lens carrier 51 in which is arranged any appropriate type of lens 52. In order to provide for focussing the camera, the lens carrier 51 is supported on a frame 53 including a vertical section 54 and a brace rod 55. This frame 53 includes a slide section 56 connected to the vertical section 54 of the frame and having marginal tongues or tenons 57 which slidably cooperate with the channels 5 in the sections 4 of the front wall of the upright 1.

The slide 56 is connected to an endless band 58 passing over upper and lower rollers 59 and 60 within the hollow upright 1, a counterbalancing weight 61 being carried by the band 58 for counterbalancing purposes, the weight being guided in vertical channels 62 in the side walls of the upright. One of the rollers 59 or 60, preferably the latter, has its shaft extended beyond one side wall of the upright and provided with a knurled disk 63 whereby the band 58 may be operated. Obviously, as illustrated, the band rollers 15, 59 and 60 may be provided with teeth or projections 64 and the respective bands 16 and 58 formed with openings to receive the teeth to avoid slippage.

In the use of the reproduction apparatus, the sensitized material is placed upon the table 8 beneath the camera and the latter bodily adjusted in accordance with the relative proportions of the reproduction and focussed by the adjustment of the lens in the usual manner for focussing a camera. Through the counterbalance weights provided, the bodily adjustment of the camera relative to the sensitized material and the focussing of the camera may be readily and easily performed and the parts so adjusted will remain in predetermined positions against casual displacement.

The image to be reproduced is placed in the image plate 26 and more particularly in the recess 28 of such plate. If the image is transparent, the lamp 38 is energized, and the light directed from the reflector 30 and through the image and lens will be directed onto the sensitized material to produce the reproduction. If the image is opaque, the lamps 49 are energized and the light therefrom is reflected from the opaque image, through the lens and onto the sensitized material.

Of course, it is understood that the operation is carried out in the usual dark room and following the exposure, the image on the sensitized material, that is the reproduction, may be developed and fixed in the usual manner.

The apparatus also provides for the copying of an image on any relative scale within the limits of the apparatus. For example, the image may be projected onto a piece of paper or other surface and will appear on such surface in the form of lights and shadows defining the image. These may be readily outlined by the use of a pencil, as for example by penciling over the light spots of the deflected image, thus reproducing the image on the copying surface.

The apparatus as a whole conveniently lends itself to reproduction in that it is arranged vertically above the surface on which the sensitized material is to be placed and in the further provision that the convenient adjustment of the camera as a whole to determine the relative size of the reproduction and also the adjustment of the camera proper for focussing is conveniently and easily carried out even by one unskilled in the art of photography, the arrangement of parts providing for these adjustments insuring that the adjustments will be maintained against casual displacement.

The interior of the camera proper is conveniently ventilated as described, thereby avoiding undue heat within the camera by reason of the illuminating means. The light socket and reflector for the transparent image may be readily and conveniently removed, following which convenient access is had to the interior of the camera in the absence of the image plate. The hollow upright 1 conveniently lends itself to support from the wall or ceiling, permitting the camera as a whole to be positioned in the dark room out of the way of other necessary operations without in any way detracting from the full and complete function of the reproduction.

What is claimed to be new is:

1. A reproduction camera including a hollow upright having the forward wall longitudinally divided and projected beyond the side walls, a camera supporting frame slidably guided by the projecting portions of the front wall, a band connected to the supporting frame, a roller within the upright over which the band passes, a counterbalance carried by the band within the upright, a camera including a lens supported in the camera supporting frame, a frame supporting lens, means for guiding the frame within the division of the front wall of the upright, an endless band connected to said means and operative within the upright, and a counterbalance carried by the endless band.

2. A reproduction camera including a hollow upright having the forward wall longitudinally divided and projected beyond the side walls, a camera supporting frame slidably guided by the projecting portions of the front wall, a band connected to the supporting frame, a roller within the upright over which the band passes, a counterbalance carried by the band within the upright, a camera including a lens supported in the camera supporting frame, a frame supporting lens, means for guiding the frame within the division of the front wall of the upright, an endless band connected to said means and operative within the upright, a counterbalance carried by the endless band, and means operative from the exterior of the upright for actuating the endless band.

3. A reproduction camera including a hollow upright having the forward wall longitudinally divided and projected beyond the side walls, a camera supporting frame slidably guided by the projecting portions of the front wall, a band connected to the supporting frame, a roller within the upright over which the band passes, a counterbalance carried by the band within the upright, a camera including a lens supported in the camera supporting frame, a frame supporting lens, means for guiding the frame within the division of the front wall of the upright, an endless band connected to said means and operative within the upright, a counterbalance carried by the endless band, and means within the upright for guiding the counterbalances.

4. A reproduction apparatus including a camera, comprising two independent sections, one of the sections being formed with an opening having an inwardly projecting flange, a bellows plate overlying the flange and having a downwardly inclined margin arranged beyond the flange, a bellows connected to said plate, and a lens plate carried by the remote end of the bellows.

5. A reproduction apparatus including a camera, comprising two independent sections, one of the sections being formed with an opening having an inwardly projecting flange, a bellows plate overlying the flange and having a downwardly inclined margin arranged beyond the flange, a bellows connected to said plate, a lens plate carried by the remote end of the bellows, a hollow upright, and means for connecting the camera casing and lens plate for independent adjustment longitudinally of the upright.

6. A reproduction apparatus including a camera, comprising two independent sections, one of the sections being formed with an opening having an inwardly projecting flange, a bellows plate overlying the flange and having a downwardly inclined margin arranged beyond the flange, a bellows connected to said plate, a lens plate carried by the remote end of the bellows, an image plate removably carried by the camera casing, a reflector arranged beyond the camera casing on one side of the image plate, a source of illumination within the reflector, and a source of illumination within the camera casing beyond the flange of the bellows plate and on the opposite side of the image plate relative to the reflector.

In testimony whereof I affix my signature.

CAMILO MEDINA ARANA. [L. S.]